Dec. 2, 1941.  W. F. GRUPE  2,264,522
METHOD AND APPARATUS FOR PRODUCING LAMINATED SHEETS
Filed Jan. 31, 1938
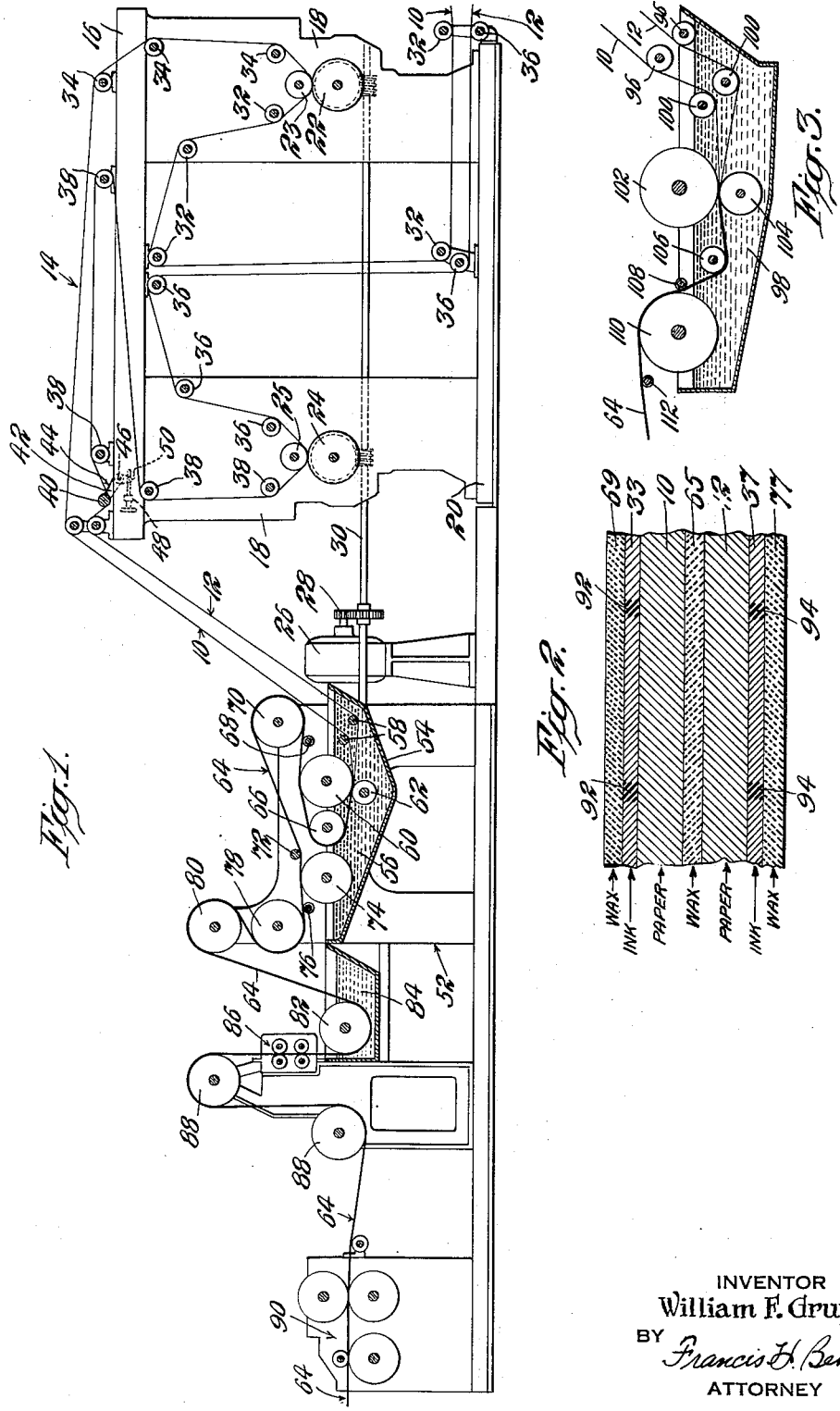
INVENTOR
William F. Grupe
BY
Francis H. Beter
ATTORNEY Patented Dec. 2, 1941

2,264,522

UNITED STATES PATENT OFFICE 2,264,522

METHOD AND APPARATUS FOR PRODUCING LAMINATED SHEETS

William F. Grupe, Lyndhurst, N. J., assignor to Champlain Corporation, a corporation of New York Application January 31, 1938, Serial No. 187,839

5 Claims. (Cl. 154—37)

This invention relates to new laminated sheets or webs of paper and the like, and to apparatus and methods for producing them. More particularly, it relates to a new type of laminated and waxed paper having registered and sharply defined markings on the two exposed surfaces thereof; and to new methods of, and apparatus for, laminating and waxing paper.

For certain types of wrappings, waxed paper is highly desirable; and it has long been conventional practice to print and wax paper for this purpose. Since waxing has a tendency to make the paper translucent, opaque wrappings have been made either from special paper, which may be prohibitively expensive, or by laminating two sheets or webs of ordinary thin paper. Laminated waxed sheets, however, are generally superior to wax coated single sheets since the additional laminating layer of wax renders the sheets more moisture-proof and more flexible.

When laminated sheets are to be used as a wrapping material, it is usual to provide some markings or imprints on the surface; and it is often desired to wax the printed surface. Heretofore, it has been customary first to laminate the webs from which the final sheets are to be made, then imprint them, and finally add the outer coating of wax, if such a coating is to be used. In any case when the sheets are pre-laminated, it is difficult to produce satisfactory printed impressions because the laminating layer of wax penetrates through the webs and makes adhesion of the ink difficult; and because the laminated sheets, due to the inner layer of wax, give a rather soft and otherwise unsuitable printing surface. In addition to these and other difficulties in applying the markings to such pre-laminated sheets, the entire procedure for producing the finished wrappers has not been carried out continuously. On the contrary, it has required many handlings of the materials and has needed great amounts of space for equipment and storage. Moreover, no one has been able heretofore continuously to make waxed and laminated sheets having printed markings on both sides, and particularly markings which are in register.

I have found it possible to produce, and have devised a novel and improved method and apparatus for making laminated sheets of paper and the like which carry, on either or both exposed surfaces, sharply defined printed impressions of a character and quality equal to those produced on ordinary paper. In accordance with my invention, this new type of laminated waxed paper is made by first printing one or both webs or paper, and feeding the webs in register and simultaneously into a bath of molten wax. The two webs are then laminated, preferably by passing them between spaced rollers while immersed in the bath, the spacing of the rollers regulating the amount of wax in the laminating layer. After withdrawing the combined web from the bath, the amount of wax coating on the exposed surfaces is determined by metering devices which remove excess wax. Both surfaces of the web may finally be glossed by passing the entire web through a cold water bath or otherwise rapidly cooling the web.

A specific embodiment of apparatus for carrying out my invention is illustrated in the accompanying drawing in which:

Fig. 1 is a diagrammatic side elevation, partly in section, of one form of apparatus for continuously producing the printed and laminated sheets;

Fig. 2 is an enlarged vertical sectional view of a portion of one of the finished laminated sheets; and Fig. 3 is a diagrammatic vertical section of a modified form of waxing unit.

In the apparatus illustrated in the drawing, an upper web 10 and a lower web 12 of paper, or other cellulosic material obtained from conveniently located reels, are fed into a printing unit 14. This unit may comprise any conventional printing or marking machine, such as a gravure printing press, or a plurality of such machines arranged in tandem relation. As shown, it includes upper frame members 16 and side frame members 18 supported in any suitable manner upon a base 20. Included within the frame of the printing unit 14 are right hand printing and impression cylinders 22 and 23 respectively, and left hand printing and impression cylinders 24 and 25, respectively. Both right and left hand sets of cylinders may be driven in unison by means of a motor 26, gearing 28 and a common drive shaft 30.

The web 10 is guided to the right hand set of cylinders 22, 23 by means of guide rolls 32 which are journalled in bearings carried by the side frame members and arranged to present the web 10 so that the upper side thereof will receive any desired impressions or markings 33 (Fig. 2). After printing, the web 10 is guided by rolls 34 to the exit side of the printing unit 14 where it is ready for the further processing which will be described below.

Similarly, the web 12 is led over guide rolls 36 to the left hand set of cylinders 24, 25. These guide rolls are arranged so that the web will be printed and receive markings 37 (Fig. 2) on its lower side. From the impression cylinders the printed web is passed over rolls 38 to the exit side of the printing unit.

In printing I prefer to use a fast drying rotogravure ink and the length of web shown in Fig. 1, which is actually very short for gravure printing, is necessary to permit the ink to dry sufficiently for subsequent treatment. However, this short web length may be decreased still further when I use an ink which can be set by hot wax (such as the ink described in Mock U. S. Patent No. 2,081,949) since the printed web may then be passed directly into the wax bath.

After the printing, the webs are ready to be joined. When the joined web is provided with markings on both exposed surfaces and it is to be cut subsequently into individual wrapping sheets, it is frequently desirable to have the markings on the one surface in register, or predetermined relation, with the markings on the other surface. In order to establish this relationship before the webs, which have been simultaneously printed as described above, are joined, I have provided a special register or web shortening roller 40 which is adapted to act upon the lower web 12 at the exit end of the printing unit. This roller 40 is journalled at each end in one arm 42 of a bell crank lever 44 which may be pivoted at 46 to the upper frame member 16. Movement of the bellcrank lever 44 about its pivot in either direction is effected by means of an elongated adjusting-screw 48 which engages with a suitably threaded and universally movable socket mounted on the other arm 50 of the bellcrank. It will be apparent that by turning the adjusting screw 48, the roller 40 will be moved so as to effect a linear adjustment of the web 12 to bring the markings thereon into register with those on the upper web 10.

Being now properly arranged at the exit end of the printing unit, the webs 10 and 12 are directed into a waxing unit 52 for joining. This unit comprises a tank or container 54 holding a bath 56 of wax or other suitable transparent adhesive material which is kept molten and at the desired temperature by any convenient heating devices. The webs are guided under rolls 58, which may be submerged in the bath, and pass between upper and lower pressure rolls 60 and 62 respectively, where they are merged into a single combined web 64. Upper roll 60 is partially submerged and lower roll 62 is completely submerged in the bath 56, and the thickness of the laminating layer 65 (Fig. 2) between the webs is accurately determined by the setting of these rolls, one of which is adjustable with respect to the other. Web 64 then passes about a partially submerged roller 66 and back over the top exposed surface of roller 60 which acts at this time as a coating roll. The axis of the roll 66 is preferably in the same horizontal plane as that of roll 60 and the roll is adjustably mounted so that the amount of wax carried on the exposed surface of roll 60 may be regulated by its companion roll 66.

Upon leaving the top surface of roller 60, the web 64 has an excess of wax on the surface which contacted the roller, so it is passed over a metering bar 68 which is adjusted or constructed to leave a wax layer 69 (Fig. 2) of the desired thickness on this one side of the web. The web then passes around a large roller 70, under a guide roll 72 and the opposite surface is brought into contact with a coating roller 74 which is partially submerged in the wax bath. This roller acts to reliquefy the wax on the unsmoothed surface of the web, and replenishes the supply, if necessary. A second metering bar 76, over which the web passes, regulates and smooths the wax to a layer 77 (Fig. 2) of the desired thickness.

At this point in its travel, the combined web 64 has a smooth layer of wax of predetermined amount on both of its surfaces. These wax layers cover the markings, which have been applied by the printing unit 14, on the individual webs 10 and 12. The fully waxed and laminated web may next be passed around rollers 78 and 80, and beneath a roller 82 in a chilled water bath 84 where the waxed surfaces are finally cooled and given a high luster or gloss. In order to keep the wax layers perfectly smooth when suddenly chilled, it is desirable to have the web 64 enter the water bath at an angle of about 45° with respect to the surface of the water. Finally the completed web may be dried by passing through a suitable drier or water removing device 86; guided over rollers 88 to a perforating machine 90, if desired; and separated into individual sheets or rewound in any convenient manner.

In Fig. 2 I have shown an enlarged section through a portion of one of my new laminated paper sheets. Here it will be observed that the original two webs 10 and 12 have been provided with markings 33 and 37, respectively, and have been sandwiched between the wax layers or laminae 69, 65 and 77. It is to be noted particularly that the markings 33 and 37 are in register; that is, the darkened sections or spaces 92 between the printed areas of the marking 33 are substantially in vertical alignment with the darkened sections or spaces 94 between the printed areas of the markings 37.

In Fig. 3 I have shown a modified form of waxing or laminating unit which embodies the same methods of lamination and coating as that shown in Fig. 1, but utilizes a preferred and simpler threading. Here it will be observed that the webs 10 and 12 are led over rollers 96 into a wax bath 98. The webs are then guided beneath rollers 100, submerged in the bath, to pressure or squeeze rolls 102 and 104, which are similar to the rolls 60 and 62 of Fig. 1 and join the webs into the combined web 64. The combined web is then passed beneath an adjustable guide roller 106, emerges from the bath and is brought into contact with a metering bar 108 which is arranged to regulate or control the thickness of the wax coating on the upper surface. The web then is passed over a coating roller 110, which replenishes the supply of wax on the lower surface, and brought into contact with a second metering bar 112 which regulates the thickness of coating on the lower surface. From the metering bar 112, the coated web may be led directly into the water bath for cooling and glossing and subsequent treatment as described above. It will be noted that in this arrangement the coated surfaces are not brought into contact with any guide rollers after metering.

Although I have described a preferred embodiment of my invention as applied to the production of laminated sheets of ordinary paper, it will be readily understood that the method and apparatus may be used equally well on other cellulosic materials such as "Cellophane," glassine and the like. By using at least one layer of glassine the resultant laminated sheet will be resistant to grease as well as moisture. It will also be apparent that if the desired degree of opacity or moisture resistance is not obtained with two webs of the cellulosic material, any desired number of additional webs may be fed into the wax bath between the top and bottom layers. Various other changes may be made in the product, method and apparatus without departing from my invention or sacrificing any of its advantages.

What I claim is:

1. A method of associating two webs, each having markings on one surface thereof, so as to produce a decorated laminated web having markings on both exposed faces thereof, which comprises arranging said webs so that the marked surfaces face outwardly and are in predetermined relationship one to another; feeding said webs into a bath of transparent bonding material; joining said webs together into a single combined web having a regulated amount of bonding material between the layers thereof; and regulating the amount of transparent bonding material adhering to both sides of the combined web.

2. A method of associating two webs, each having markings on one surface thereof, so as to produce a laminated web having markings on both exposed faces thereof, which comprises feeding said marked webs into a bath of transparent thermoplastic bonding material in such a manner that they will be brought together beneath the surface of the bonding material with the markings on the exposed surfaces thereof and with said markings in predetermined relationship one to another; regulating the amount of bonding material between said webs; regulating the amount of bonding material on one of the exposed surfaces of the combined web into a smooth layer of predetermined thickness; regulating the amount of bonding material on the other exposed surface of said web into a layer of predetermined thickness; and immediately cooling the thus treated web so that the thermoplastic bonding material will set and the markings on the exposed surfaces of the completely laminated web will remain in their predetermined relationship one to another.

3. A method of continuously producing decorated laminated wrappers by associating two paper webs, each web having markings on one surface thereof, which comprises arranging said webs adjacent each other with the marked surfaces exposed and in predetermined relationship one to another; feeding the thus arranged webs into a bath of molten wax; regulating the amount of wax between said webs; regulating the amount of wax adhering to one side of the web into a layer of predetermined thickness; regulating the amount of wax adhering to the other side of the combined web into a layer of predetermined thickness; feeding the combined web into a bath of cold water so as to cause the molten wax to set and thereby maintain the markings in their predetermined relationship on the exposed surfaces of the combined web; and cutting said combined web into sheets of predetermined size.

4. Apparatus for continuously producing decorated and laminated webs by associating two webs, each of which has markings on one surface thereof, which comprises means for arranging said webs with the unmarked surfaces adjacent each other and the markings on the first web in predetermined relationship with the markings on the second web; a container adapted to hold a bath of molten wax; guide rollers disposed within said container for maintaining said webs out of contact as they enter the bath of wax; a large roller at least partially submerged in the bath and with which the webs are adapted to contact and be brought together; means for regulating the amount of wax between the two webs; means for regulating the amount of wax adhering to one of the exposed surfaces of the combined web; and means for regulating the amount of wax adhering to the other exposed surface of the combined web.

5. In combination with means for feeding a plurality of webs of cellulosic material, a laminating unit comprising a container adapted to hold a bath of transparent bonding material; means at least partially submerged within said bath for regulating the amount of bonding material between adjacent faces of the plurality of webs; means disposed within said container for guiding each of said webs to said last mentioned means; means for guiding the web from said regulating means to a position outside of the bath of transparent material and above said container; means disposed above said container and in the path of said web for regulating the amount of bonding material adhering to one side of the combined web so as to produce a smooth layer of predetermined thickness; and means also disposed above said container and beyond said last mentioned regulating means for regulating the amount of bonding material adhering to the other side of the combined web so as to produce a smooth layer of predetermined thickness.

WILLIAM F. GRUPE.